(12) United States Patent
Rolandson et al.

(10) Patent No.: US 11,815,038 B2
(45) Date of Patent: Nov. 14, 2023

(54) COMBUSTION ENGINE WITH A FUEL REFORMER AND DISTILLER ASSEMBLY

(71) Applicant: Volvo Car Corporation, Gothenburg (SE)

(72) Inventors: Ola Rolandson, Vänersnäs (SE); Joshua Dudley, Sävedalen (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/169,434

(22) Filed: Feb. 15, 2023

(65) Prior Publication Data

US 2023/0265803 A1     Aug. 24, 2023

(30) Foreign Application Priority Data

Feb. 24, 2022 (EP) .................................... 22158457

(51) Int. Cl.
    *F02M 27/02*      (2006.01)
    *F02D 19/06*      (2006.01)
    *F02M 31/16*      (2006.01)
    *F02B 43/10*      (2006.01)

(52) U.S. Cl.
CPC .......... *F02D 19/0671* (2013.01); *F02B 43/10* (2013.01); *F02D 19/0644* (2013.01); *F02M 31/16* (2013.01)

(58) Field of Classification Search
CPC .... F02D 19/08; F02D 19/081; F02D 41/0025; F02B 43/10; F02B 47/02; F02B 47/04; F02M 27/02; F02M 31/14; C10L 7/04
See application file for complete search history.

(56) References Cited

U.S. PATENT DOCUMENTS

2007/0204813 A1    9/2007   Arai et al.

FOREIGN PATENT DOCUMENTS

| EP | 2048339 A1 | 4/2009 |
| WO | 2015004668 A1 | 1/2015 |
| WO | WO-2019230226 A1 * | 12/2019 |

OTHER PUBLICATIONS

Extended EP Search Report for EP Application No. 22158457.6 dated Sep. 2, 2022.

* cited by examiner

*Primary Examiner* — George C Jin
*Assistant Examiner* — Teuta B Holbrook
(74) *Attorney, Agent, or Firm* — Amin, Turocy & Watson, LLP

(57) ABSTRACT

An internal combustion engine assembly comprises: a fuel tank for containing fuel comprising alcohol, a reformer unit being in heat exchanging contact with exhaust gases from an exhaust system, for steam reforming of alcohol, a water supply unit connected to a water steam inlet of the reformer unit, and a distiller unit being with a fuel inlet connected to a distiller supply duct that is connected to the fuel tank, an alcohol outlet of the distiller unit being connected to the inlet of the reformer unit. The increased alcohol concentrations at the inlet of the steam reformer result in improved efficiency of the reforming process.

16 Claims, 3 Drawing Sheets

COMBUSTION ENGINE WITH A FUEL REFORMER AND DISTILLER ASSEMBLY

TECHNICAL FIELD

The invention relates to an internal combustion engine assembly comprising:

a fuel tank for containing fuel comprising alcohol, the fuel tank being connected via a fuel supply duct to a fuel inlet of at least one of a number of cylinders, the cylinders being with an outlet connected to an exhaust system, and a reformer unit being in heat exchanging contact with exhaust gases from the exhaust system for steam reforming of the alcohol, the reformer unit being with a reformer outlet connected to the fuel inlet of the cylinders.

The invention also relates to a vehicle comprising such an internal combustion engine assembly.

BACKGROUND ART

Fuel for internal combustion engines may contain varying amounts of ethanol.

Bio-ethanol may constitute 10% (E10) to 85% (E85) of bio-fuel mixtures. Fuel of the type E10 is used in numerous countries in Europe and increasing use of bio-ethanol is part of the goal to reduce the dependency of fossil fuels.

As currently available Bio-fuels can only account for a part of the reduction in $CO_2$ emissions, the increase in efficiency of the ICE is of importance. One method for increasing the thermal efficiency of the ICE comprises Waste Heat Recovery (WHR) in combination with fuel reforming technology. Fuel reforming uses the heat available in the exhaust gases to upgrade a low carbon fuel to a higher energy level hydrogen fuel that is combusted, with a higher thermal efficiency of the ICE as a result.

Steam reforming of ethanol requires a relatively large amount of energy, and the temperature that is required for full conversion of ethanol is about 700K. It is known to provide an aqueous ethanol solution to a reformer that is heated by the high-temperature exhaust gases. In the reformer, syngas, consisting of CO and $H_2$ is formed that is fed to a separator that cools the mixed gas, condense water vapor and separates into gas and liquid. A recovery tank collects recovery solution separated by the separator, and hydrogen is fed to the cylinders of the ICE.

Under cold start conditions, the emissions of unburned hydrocarbons is relatively high as the evaporation of the fuel at low temperatures is relatively incomplete. The same applies to idling and low load conditions of the cylinders.

It is an object to provide a combustion engine assembly that is at least partly powered by bio-alcohol, using steam reforming of the alcohol with improved efficiency. It is a further object to provide a combustion assembly having reduced emissions at start up and during transient conditions.

SUMMARY

An internal combustion engine assembly according to the disclosure comprises a water supply unit, comprising an evaporator that is in heat exchanging contact with the exhaust system, the water supply unit being with an outlet connected to a water steam inlet of the reformer unit, and a distiller unit being with a fuel inlet connected to a distiller supply duct that is connected to the fuel tank, the distiller unit comprising a heat exchange element that is in heat exchanging contact with the exhaust system, an alcohol outlet that is connected to the inlet of the reformer unit and a high volatile fraction outlet for supplying components of the fuel with a boiling point below a boiling point of alcohol, preferably below 80° C.

By removing in the distiller unit the high volatile fraction from the fuel that is fed into the reformer unit, the high volatile fuel fraction having a boiling point below that of the alcohol, preferably below 80° C., and separating it from the alcohol prior to supplying the alcohol to the steam reformer unit, the concentration of alcohol that in the reformer unit is increased. This results in improved efficiency of the reforming process and in a higher $H_2$ yield.

The alcohol may comprise methanol and/or ethanol and preferably comprises ethanol. The fuel may comprise fuel blends such as E5-E25 that contain 5%-25% by volume of ethanol.

As steam reforming of isooctane requires 8.4 times the amount of energy per mole and produces only 4.2 times the amount $H_2$ per mole (including the water gas shift reaction) compared to ethanol, the increase of the concentration of ethanol in the feed steam of the reforming process will produce 2 times more hydrogen per energy unit.

On board fuel distillers are known in the art for use in vehicles with a combustion engine, for tailpipe emission reduction under cold start conditions.

The distiller unit may be adapted to provide at the alcohol outlet a concentration of at least 50% of ethanol For the E10 fuel that is fed into the distiller unit, about 20% is formed by ethanol and about 40% is formed by a high volatile fraction comprising hexene, pentene, butene, propene and ethene.

The heat exchanger may be connected with a first inlet to the water supply unit for receiving heated water, that is passed via a first outlet of the heat exchanger to the reformer unit, and with a second inlet that is connected to the distiller supply duct for receiving fuel that is passed via a second outlet of the heat exchanger to a distillation member.

Water steam that is produced by the supply of heat from the exhaust gases, is used for heating of the fuel in the heat exchanger of the distiller unit. Pressures of the water steam may amount to about 10 bar at temperatures of 150° C., so that the temperatures during distillation remain in the range in which coking of the fuel is avoided. After passing through the heat exchanger of the distiller unit, the water steam enters into the reformer unit to react with the ethanol fraction of the fuel.

The distiller unit may be connected with the high volatile fraction outlet to a high volatile tank, via a condenser, and comprising a low volatile fraction outlet that is connected to the fuel tank.

The distiller unit produces three fuel fractions, of which the high volatile components can be mixed with the fuel or can be supplied to the cylinders during cold start or transient conditions, to reduce emissions. The low volatile fraction of the distiller unit may be fed back into the fuel tank.

The low volatile outlet of the distiller unit may be connected to a low volatile tank (60) that is connected to the fuel inlet (24) of the cylinders (3).

By collecting the low volatile fraction into a separate low volatile tank, rather than into the fuel tank, the concentration of the fuel in the in fuel tank is kept constant.

An outlet of the fuel tank may be connected to the outlet of the low volatile tank via a control valve that connects to the fuel supply duct. The fuel may be supplied to the cylinders via the control valve which supplies mixtures of the fuel and the low volatile fraction to the cylinders, wherein the low volatile fraction is supplied at middle and high load points where full combustion can be ensured.

The alcohol outlet of the distiller unit may be connected to a heat exchanger that is connected via a duct to the outlet of the water supply unit.

Prior to entering into the reformer unit, the ethanol from the distiller unit is evaporated and the temperature may be raised to 450° C.-650° C. for optimal fuel conversion.

The high volatile fraction outlet of the distiller unit may be connected to a mixing tank via a condenser, and comprising a low volatile fraction outlet connected to the mixing tank, the mixing tank being connected to the fuel inlet of the cylinders.

The distillation unit may comprise a first stage comprising the low volatile fraction outlet, and a second stage comprising the high volatile fraction outlet.

The first stage may operate at temperatures between 83° C. and 86° C. where the second stage can have temperatures of 74° C.-76° C.

The water supply unit may comprise a condenser with a cooling member contacting the exhaust gases, for condensing water from the exhaust gases and a condensate drain that is connected to the evaporator.

By using the condensate from the exhaust gases, no separate water supply is needed.

A controller may be provided for controlling the fuel supply from the high volatile tank or the mixing tank to the cylinders for reducing emissions at cold start conditions or during idle or low load conditions.

By supplying the cylinders with a high volatile fuel fraction at cold start or during idle conditions, the emissions of unburned hydrocarbons and PM may be reduced.

The controller may fill the fuel injection system substantially with fuel from the high volatile tank or fuel from the mixing tank under idle conditions and/or at low load points.

By filling the high pressure fuel system of the cylinders with the high volatile fraction on all idle and low load points, the fuel system is ready for a next (day) cold start.

BRIEF DESCRIPTION OF THE DRAWINGS

A number of embodiments will, by way of non-limiting example, be described in detail with reference to the accompanying drawings. In the drawings.

DETAILED DESCRIPTION

Figure 1:
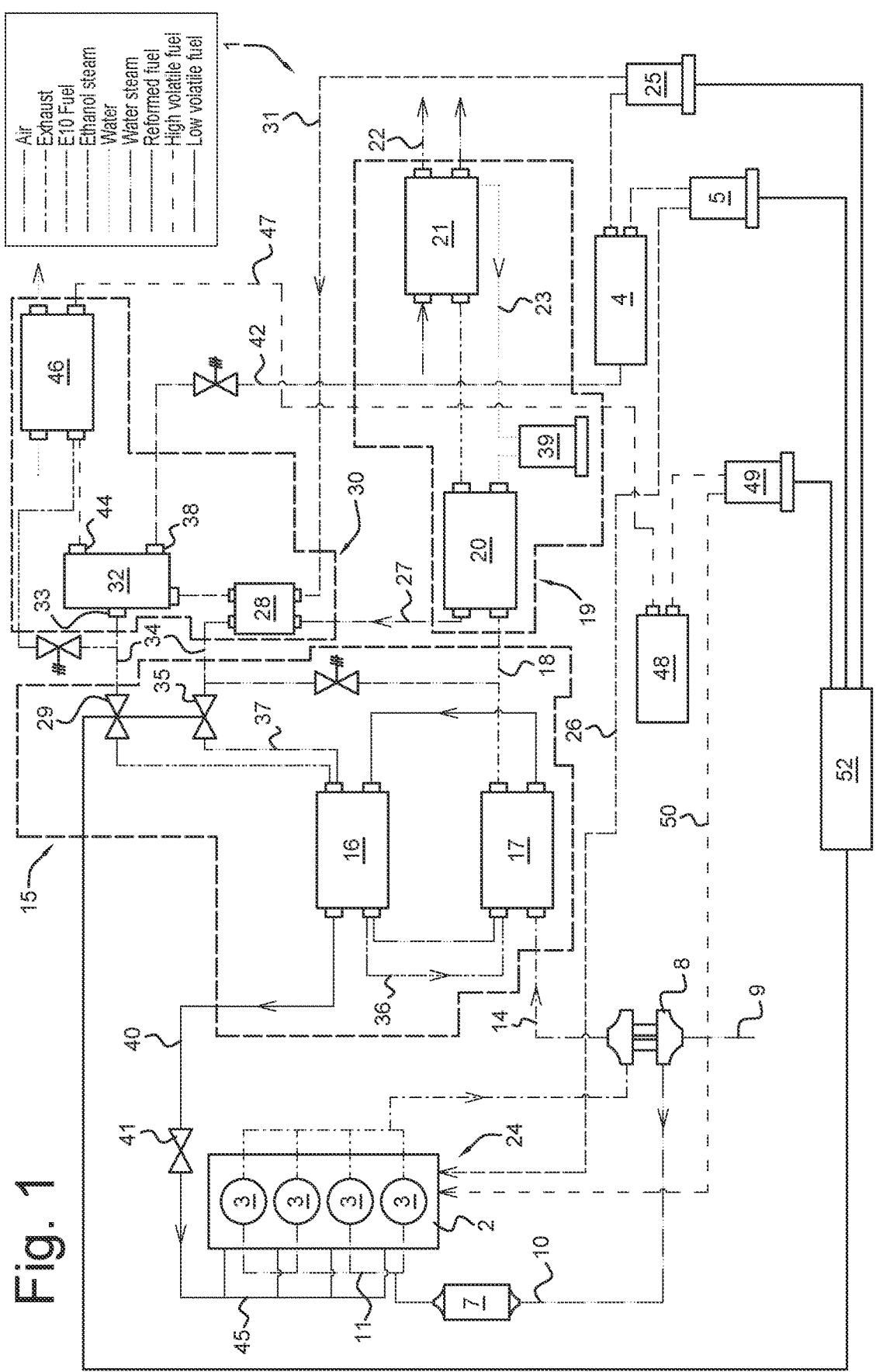
FIG. 1 shows a schematic lay-out of a combustion engine assembly comprising a three fraction distiller unit and an ethanol steam reforming unit.

FIG. 1 shows an internal combustion engine (ICE) assembly 1 with an ICE 2 having four cylinders 3. A fuel tank 4 containing an alcohol such as bio-ethanol, for instance in the form of an E10 type of fuel, is connected to the fuel injection system of the cylinders 3 via a fuel pump 5 and a fuel supply duct 6.

A turbocharger 8 compresses the air that is supplied from an air intake 9 and transports the intake air through an air duct 10 via a cooling unit 7 to the intake manifold 11 for supply to the cylinders 3. The exhaust gases of the fuel that has been burned in the cylinders 3, leave the ICE 2 via an exhaust manifold 12 and flow through an exhaust duct 13 to drive the turbocharger 8. After passing the turbocharger 8, the exhaust gases pass via the duct 14 into a reformer unit 15, comprising a heat exchanger 16 and a catalytic converter/fuel reformer 17.

Via an exhaust duct 18, the exhaust gases pass to a water supply unit 19, comprising a water evaporator 20 and an air cooled water condenser 21. At a condensate drain 23, the water that has been condensed from the exhaust gases is collected and is passed via a water pump 39 to the water evaporator 20.

On leaving the water supply unit 19, the exhaust gases pass to a tail pipe 22 to be expelled into the ambient.

A second fuel pump 25 supplies fuel from the fuel tank 4, which fuel contains alcohol such as methanol and/or ethanol, to a distiller unit 30 via a distiller supply duct 31. In the evaporator 28, the fuel is evaporated by heat exchange with water steam that has been formed in water evaporator 20 and that is transported from the evaporator 28 through a water steam supply duct 27.

The evaporated fuel is distilled in a distiller 32 that produces ethanol at an outlet 33. The ethanol is supplied to the inlet 34 of the reformer unit 15. Through the water steam supply duct 37, the water steam enters into the reformer unit 15. The ethanol and water steam are mixed in the heat exchanger 16, the mass ratio being controlled by the pump mass flow of the fuel pump 25 and water pump 39. The pre-heated water steam and ethanol steam mixture is then fed from the heat exchanger 16 into the integrated catalytic converter/fuel reformer unit 17 through duct 36, where the water and ethanol steam are transformed into syngas containing $H_2$.

The reformed fuel that is produced in the integrated catalytic converter/fuel reformer unit 17 is cooled in the pre-heater/cooler unit 16 where it is brought in heat exchanging contact with the water/ethanol steam that is supplied at inlet 34 to preheat the water and ethanol. Via an outlet duct 40 and a reduction valve 41, the syngas is supplied to a gas inlet manifold 45 that is connected to the cylinders 3.

The distiller 32 is a 3-fraction distiller and has a high volatile fraction outlet 35 and a low volatile fraction outlet 38. The high volatile fraction of the fuel that is distilled in the distiller 32 is passed through a water-cooled condenser 46 into a return duct 47 to be collected in a high volatile tank 48. Via a pump 49 and duct 50 the high volatile fraction is transported to the fuel injection system of the cylinders 3 of the ICE 2.

The low volatile fraction of the fuel is recirculated from the outlet 38 to the fuel tank 4 through a duct 42.

The pumps 5,25 and 49 and the valves 29,35 that determine the mass flow of water and ethanol steam to the reformer unit 15, are controlled by a controller 52, which may comprise the Engine Control Module (ECM). The pump 49 can be operated to reduce cold start emissions by activating the pump 49 to load high volatile fuel components from the tank 48 into the injection system of the cylinders 3 during idle and low load conditions of the ICE 2. Prior to the ICE 2 being switched off, the high-pressure injection system of the cylinders 3 is filled with high volatile fuel components from tank 48, so that upon the next start cycle emissions of hydrocarbons and particulate matter (PM) are reduced.

Figure 2:
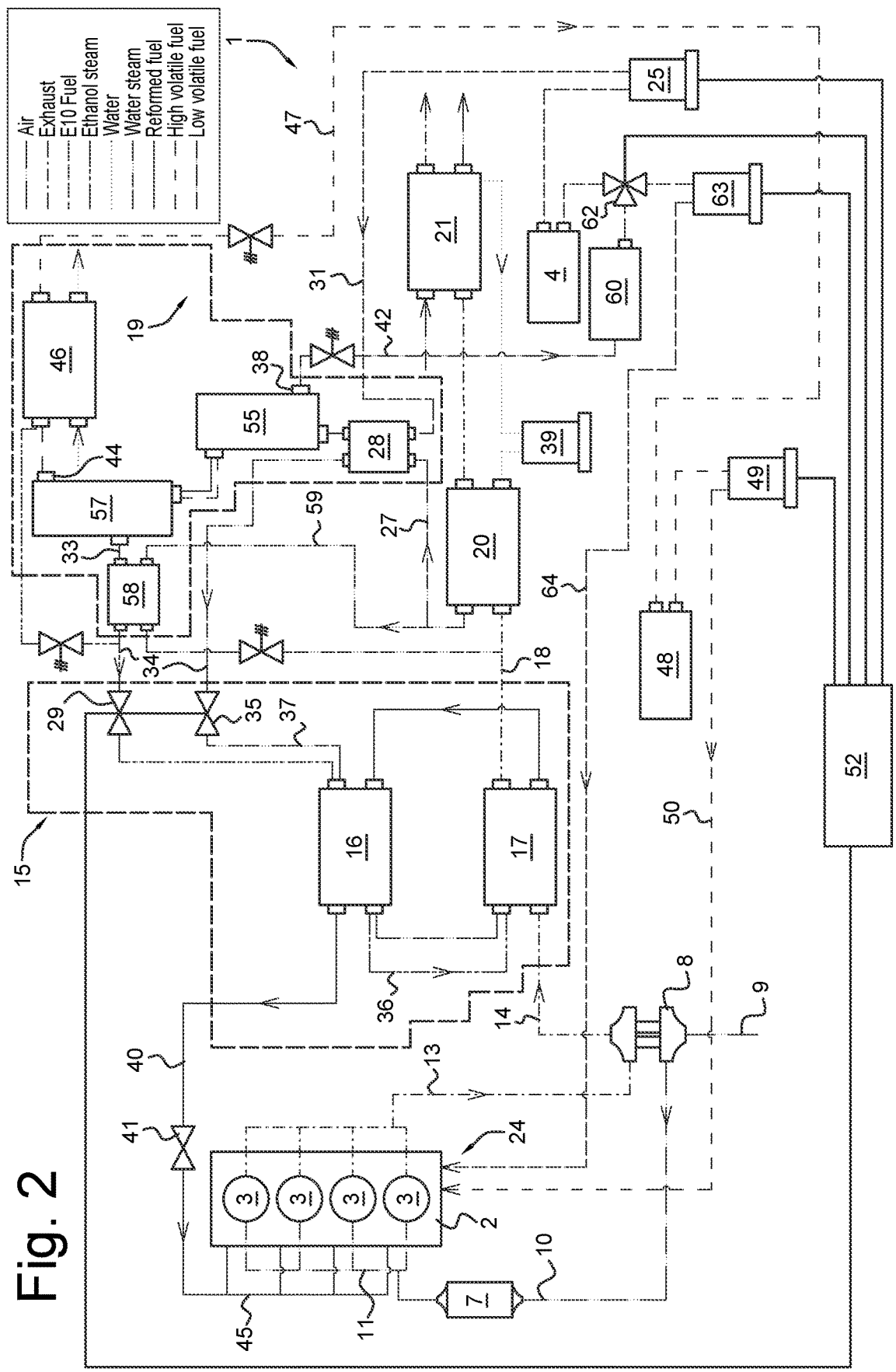
FIG. 2 shows a schematic lay-out of a combustion engine assembly comprising a distiller unit having a high volatile stage and a low volatile stage.

FIG. 2 shows an ICE assembly 1 with a reformer unit 15 having a first distiller stage 55 with the low volatile fraction outlet 38, operating at temperatures of 82° C.-88° C., and a second distiller stage 57 that operates at temperatures of 72° C.-76° C. The liquid ethanol at the ethanol outlet 38 of the second distiller stage 57 is fed through an evaporator 58 that supplies ethanol steam to the reformer unit 15. The heat exchanger of the evaporator 58 is connected to the water evaporator 20 via a steam supply duct 59.

The low volatile fraction outlet 38 of the first distiller stage 55 is connected to a low volatile tank 60. Via a three-way valve 62 and a pump 63, that are controlled by the controller 52, a mixture of fuel from the tank 4 and from the low volatile tank 60 is supplied via a duct 64 to the fuel injection system of the cylinders 3 at middle and high load points of the ICE 2 to ensure full combustion. The use of individual tanks 4, 48 and 60 for the fuel and high and low volatile fractions, prevents a shift in concentration in the fuel in the tank 4.

Figure 3:
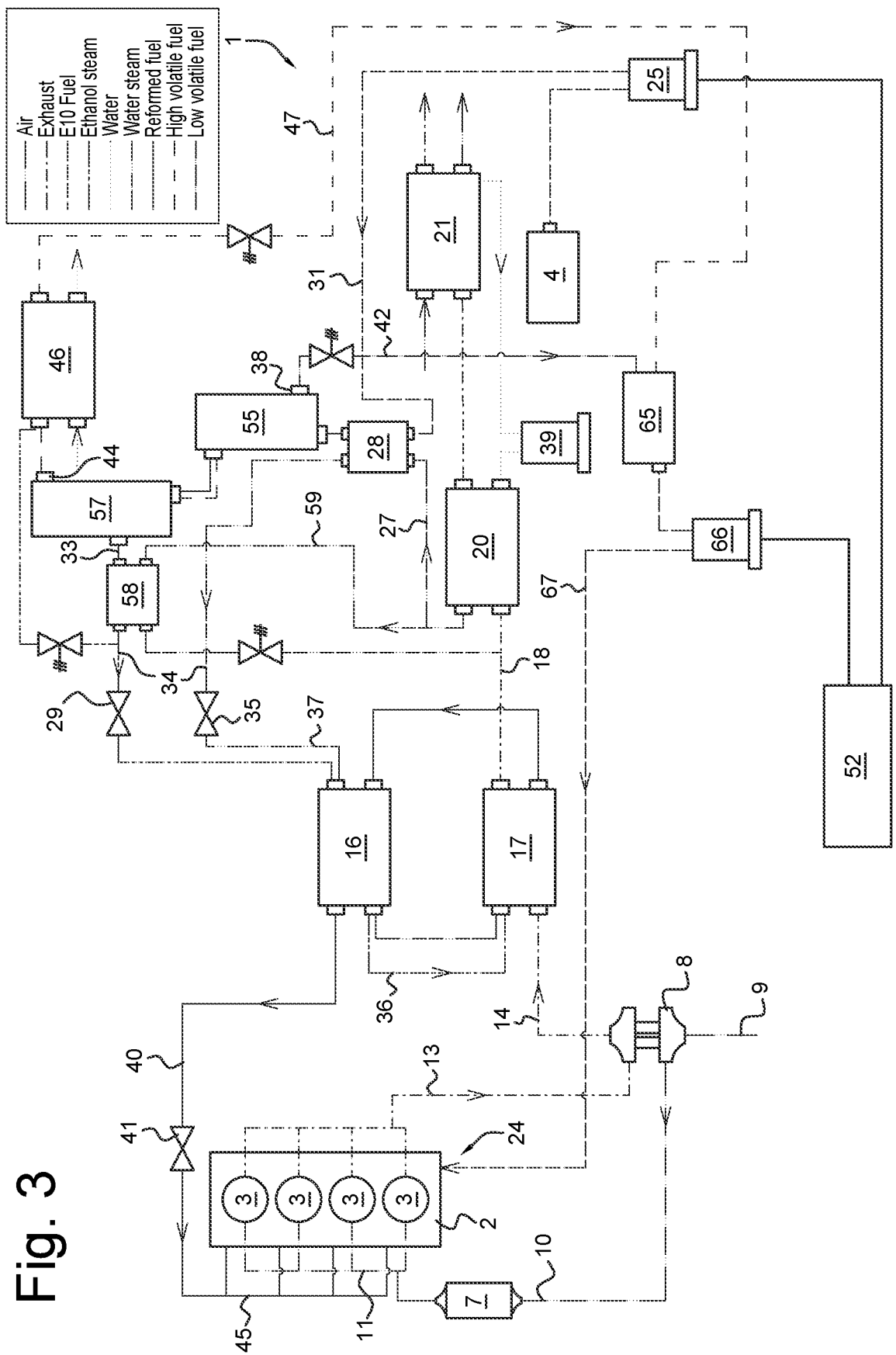
FIG. 3 shows the combustion engine assembly of FIG. 2 comprising a fuel mixing tank for mixing of the high and low volatile fractions.

FIG. 3 shows an embodiment in which the low volatile fuel fraction and the high volatile fuel fraction are collected in a mixing tank 65 via the ducts 42, 47. The mixing tank 65 is connected to the fuel inlet of the cylinders 3 via a duct 67.

The invention claimed is:

1. Internal combustion engine assembly comprising:
   a fuel tank for containing fuel comprising alcohol, the fuel tank being connected via a fuel supply duct to a fuel inlet of at least one of a number of cylinders, the cylinders being with an outlet connected to an exhaust system,
   a reformer unit being in heat exchanging contact with exhaust gases from the exhaust system, for steam reforming of alcohol, the reformer unit being with a reformer outlet connected to the fuel inlet of the cylinders,
   a water supply unit, comprising an evaporator that is in heat exchanging contact with the exhaust system, the water supply unit being with an outlet connected to a water steam inlet of the reformer unit, and
   a distiller unit being with a fuel inlet connected to a distiller supply duct that is connected to the fuel tank, the distiller unit comprising a heat exchange element that is in heat exchanging contact with the exhaust system, an alcohol outlet that is connected to the inlet of the reformer unit and a high volatile fraction outlet for supplying components of the fuel with a boiling point below a boiling point of alcohol.

2. The internal combustion engine assembly according to claim 1, wherein the alcohol comprising methanol or ethanol.

3. The internal combustion engine assembly according to claim 2, wherein the distiller unit being adapted to provide at the alcohol outlet a concentration of at least 50% of ethanol.

4. The internal combustion engine assembly according to claim 1, wherein the distiller unit comprising a heat exchanger that is connected with a first inlet to the water supply unit for receiving heated water, that is passed via a first outlet of the heat exchanger to the reformer unit, and with a second inlet that is connected to the distiller supply duct for receiving fuel that is passed via a second outlet of the heat exchanger to a distillation member.

5. The internal combustion engine assembly according to claim 1, wherein the distiller unit being with the high volatile fraction outlet connected to a high volatile tank, via a condenser, and comprising a low volatile fraction outlet that is connected to the fuel tank.

6. The internal combustion engine assembly according to claim 5, wherein the alcohol outlet of the distiller unit being connected to a heat exchanger that is connected via a duct to the outlet of the water supply unit.

7. The internal combustion engine assembly according to claim 5, comprising a controller for controlling fuel supply from the high volatile tank or the mixing tank to the cylinders for reducing emissions at cold start conditions or during idle or low load conditions.

8. The internal combustion engine assembly according to claim 7, wherein the controller filling a fuel injection system of the cylinders substantially with fuel from the high volatile tank or fuel from the mixing tank under idle conditions or at low load points.

9. The internal combustion engine assembly according to claim 1, wherein the distiller unit being with the high volatile fraction outlet connected to a high volatile tank, via a condenser, and comprising a low volatile fraction outlet connected to a low volatile tank that is connected to the fuel inlet of the cylinders.

10. The internal combustion engine assembly according to claim 9, wherein an outlet of the fuel tank being connected to the outlet of the low volatile tank via a control valve that connects to the fuel supply duct.

11. The internal combustion engine assembly according to claim 1, wherein the distiller unit being with the high volatile fraction outlet connected to a mixing tank via a condenser, and comprising a low volatile fraction outlet connected to the mixing tank, the mixing tank being connected to the fuel inlet of the cylinders.

12. The internal combustion engine assembly according to claim 1, wherein the distillation unit comprises a first stage comprising the low volatile fraction outlet, and a second stage comprising the high volatile fraction outlet.

13. The internal combustion engine assembly according to claim 1, wherein the water supply unit comprising a condenser, with a cooling member contacting the exhaust gases, for condensing water from the exhaust gases and a condensate drain that is connected to the evaporator.

14. The internal combustion engine assembly of claim 1, wherein the boiling point below the boiling point of alcohol is below 80° C.

15. The vehicle of claim 14, wherein the boiling point below the boiling point of alcohol is below 80° C.

16. A vehicle comprising:
   an internal combustion engine assembly, comprising:
      a fuel tank for containing fuel comprising alcohol, the fuel tank being connected via a fuel supply duct to a fuel inlet of at least one of a number of cylinders, the cylinders being with an outlet connected to an exhaust system,
      a reformer unit being in heat exchanging contact with exhaust gases from the exhaust system, for steam reforming of alcohol, the reformer unit being with a reformer outlet connected to the fuel inlet of the cylinders,
      a water supply unit, comprising an evaporator that is in heat exchanging contact with the exhaust system, the water supply unit being with an outlet connected to a water steam inlet of the reformer unit, and
      a distiller unit being with a fuel inlet connected to a distiller supply duct that is connected to the fuel tank, the distiller unit comprising a heat exchange element that is in heat exchanging contact with the exhaust system, an alcohol outlet that is connected to the inlet of the reformer unit and a high volatile fraction outlet for supplying components of the fuel with a boiling point below a boiling point of alcohol.

* * * * *